United States Patent [19]

Snelling et al.

[11] Patent Number: 4,706,210
[45] Date of Patent: Nov. 10, 1987

[54] GUILD ARRAY MULTIPLIER FOR BINARY NUMBERS IN TWO'S COMPLEMENT NOTATION

[75] Inventors: William E. Snelling, Columbia; John E. Penn, Sykesville, both of Md.

[73] Assignee: The Johns Hopkins University, Baltimore, Md.

[21] Appl. No.: 681,158

[22] Filed: Dec. 13, 1984

[51] Int. Cl.$^4$ .............................................. G06F 7/52
[52] U.S. Cl. .................................................. 364/758
[58] Field of Search ...................................... 364/758

[56] References Cited

U.S. PATENT DOCUMENTS 4,432,066  2/1984  Benschop ............................ 364/758
4,616,330 10/1986  Betz ..................................... 364/758

OTHER PUBLICATIONS

Pekmestzi et al., "A Two's Complement Cellular Array Multiplier", *The Radio & Electronic Engineer*, vol. 51, No. 2, pp. 94–96, Feb. 1981.

Isbery, "Electronic Switching Circuits for Multiplication", *IBM Tech. Disclosure Bulletin*, vol. 8, No. 2, Jul. 1965, pp. 258–259.

Dadda, "Some Schemes for Parallel Multipliers", *Alta Frequenza*, vol. XXXIV, No. 5, pp. 349–356, 1965.

Deverell, "Pipeline Iteratire Arithmetic Arrays", *IEEE Trans. on Computers*, Mar. 1975, pp. 317–322.

*Primary Examiner*—David H. Malzahn
*Attorney, Agent, or Firm*—Robert E. Archibald; Carl I. Brundidge

[57] ABSTRACT

The invention concerns a Guild array multiplier for two's complement notation. Three major cell types are used as building blocks in the array, the cells differing by a simple carry circuit only.

15 Claims, 10 Drawing Figures

CELL TYPE M1
| INPUT | | | OUTPUT | |
|---|---|---|---|---|
| V | XY | Ci | Ci+1 | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |
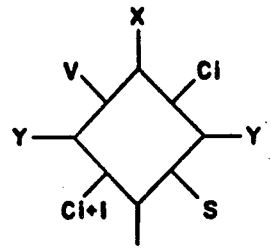
FIG. 1a
CELL TYPE M2
| INP | | | OUTPUT | |
|---|---|---|---|---|
| V | XY | Ci | Ci+1 | S |
| 0 | 0 | 0 | 0 | 0 |
| 0 | 0 | 1 | 0 | 1 |
| 0 | -1 | 0 | -1 | 1 |
| 0 | -1 | 1 | 0 | 0 |
| -1 | 0 | 0 | -1 | 1 |
| -1 | 0 | 1 | 0 | 0 |
| -1 | -1 | 0 | -1 | 0 |
| -1 | -1 | 1 | -1 | 1 |
FIG. 1b
CELL TYPE M3
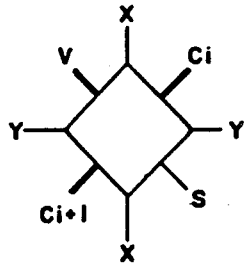
| INPUT | | | OUTPUT | |
|---|---|---|---|---|
| V | XY | Ci | Ci+1 | S |
| 0 | 0 | 0 | 0 | 0 |
| 0 | 0 | -1 | -1 | 1 |
| 0 | 1 | 0 | 0 | 1 |
| 0 | 1 | -1 | 0 | 0 |
| -1 | 0 | 0 | -1 | 1 |
| -1 | 0 | -1 | -1 | 0 |
| -1 | 1 | 0 | 0 | 0 |
| -1 | 1 | -1 | -1 | 1 |
FIG. 1c
CELL TYPE M4
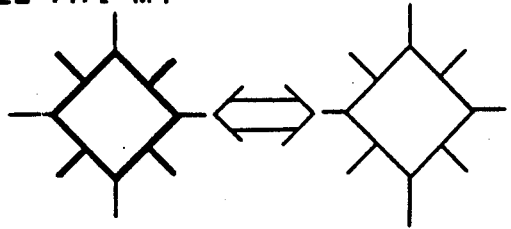
FIG. 1d

MULT. OF -2 X 3

GUILD ARRAY MULTIPLIER FOR BINARY NUMBERS IN TWO'S COMPLEMENT NOTATION

STATEMENT OF GOVERNMENTAL INTEREST

The Government has rights in this invention pursuant to Contract No. N00024-83-C-5301 awarded by the Department of the Navy.

BACKGROUND OF THE INVENTION

The invention concerns a circuit comprising three types of signed, gated, adder cells arranged in Guild array for multiplying two binary numbers using two's complement notation. In computing systems the speed of the arithmetic unit in processing data is a very important concern. In an effort to enhance the operating of arithmetic units, non-cellular parallel multipliers were first proposed. Cellular arrays followed shortly thereafter which are easily integrated upon a chip and are readily manufacturable with large scale integration (LSI) techniques. As an example, the Guild array cellular multiplier utilizes a basic cell having a 1-bit gated full adder for performing the arithmetic function:

$$S + 2C_{i+1} = V + XY + C_i$$

where $C_i$ and $C_{i+1}$ are the carry input and output, X and Y are the 1 bit multiplier and multiplicand, S is the sum, and V is the sum of the previous partial product. Such a Guild array is completely iterative and has, for N bit operands, $N^2$ cells and a maximum delay of $2N-1$ cells. Each cell can be implemented on two logic levels, neglecting the necessity for inverters. The cellular multiplier, such as the Guild array, has an operating speed which is relatively slow compared with a non-cellular multiplier. See "Pipeline Multipliers Implemented with Microcells" by L. Ciminiera and A. Serra, IEEE International Symposium on Circuits and Systems, 1980, Vol. 1, pages 393-398. To improve the efficiency of Guild array multipliers, pipelining (the beginning of one instruction sequence before another has been completed) of the Guild array was proposed. See "Pipeline Iterative Arithmetic arrays" by John Deverell, IEEE Transactions on Computers, March 1975, pages 317-322.

Consider a binary computer wherein numbers are represented by 8 bits, for instance, the first denoting the sign (0 for plus, 1 for minus) and the remaining seven bits representing an integer. With two's complement notation, in order to add two such numbers, all bits of the 8-bit word (including the sign bit) are treated equally. The two numbers are added and any carry to the left of the eigth position is discarded. However, when a negative number is represented in one's complement notation, if a carry occurs to the left of the eighth position, such a carry must be shifted and added to the first or least significant position. It is apparent that processing of integers represented in two's complement notation avoids the necessity of an additional processing step. In consideration of the advantage in utilizing two's complement notation, multipliers using such notation have been developed. U.S. Pat. No. 4,369,500 to Fette teaches a repeated addition type multiplying circuit having rows and columns of gated adder cells. The arrangement of cells in Fette's circuit allows the multiplication of an N-bit multiplicand with and M-bit multiplier, wherein the integers processed therein are represented by two's complement notation. Though Fette uses an N×M grid-like arrangement, multiplication of a two's complement number with a Guild array is not taught or discussed. Thus, for the multiplication of numbers represented by N and M bits, a large chip surface area is required, as compared to a multiplying Guild array, as in accordance with the present invention. Benschop, in U.S. Pat. No. 4,432,066, discloses a device in which only two different module types are arranged in a circuit for the multiplication of numbers in two's complement notation as well as in the sign-magnitude notation (1's complement). Benschop's multiplier array also provides a pipe line function so that a much higher speed can be achieved by the circuit in processing data. Benschop's multiplier array would require a relatively large chip surface area as compared to the present invention. Benschop's multiplier is arranged in a substantially diagonal format, but does not teach or discuss a Guild array.

SUMMARY AND OBJECTS OF THE INVENTION

The invention is drawn to a Guild array multiplier using two's complement notation.

Three basic cells which are based on binary truth tables form the building blocks of a digital multiplier, wherein cells are arranged in a triangular format. In accordance with the present invention, the arrangement of the three basic cells of a triangular format (or Guild array) permits the multiplication of numbers utilizing two's complement notation. The cells comprise signed gated adder circuits and differ in terms of their respective carry-circuits. To enhance efficiency of the present Guild array multiplier, the array may be latched to permit pipelining.

It is an object of the invention to provide a multiplier for handling binary numbers in two's complement notation.

It is another object of the invention to provide a binary multiplier having a plurality of cells arranged in a Guild array.

It is a further object of the invention to provide a two's complement multiplier, the cells of which are substantially similar.

An additional object of the invention is to provide a two's complement multiplier which may be easily integrated onto a chip and is very suitable for large scale integration.

BRIEF DESCRIPTION OF THE DRAWINGS

FIG. 1a and 1d portray the cell types utilized in the present invention.

DETAILED DESCRIPTION OF THE INVENTION

Figure 2:
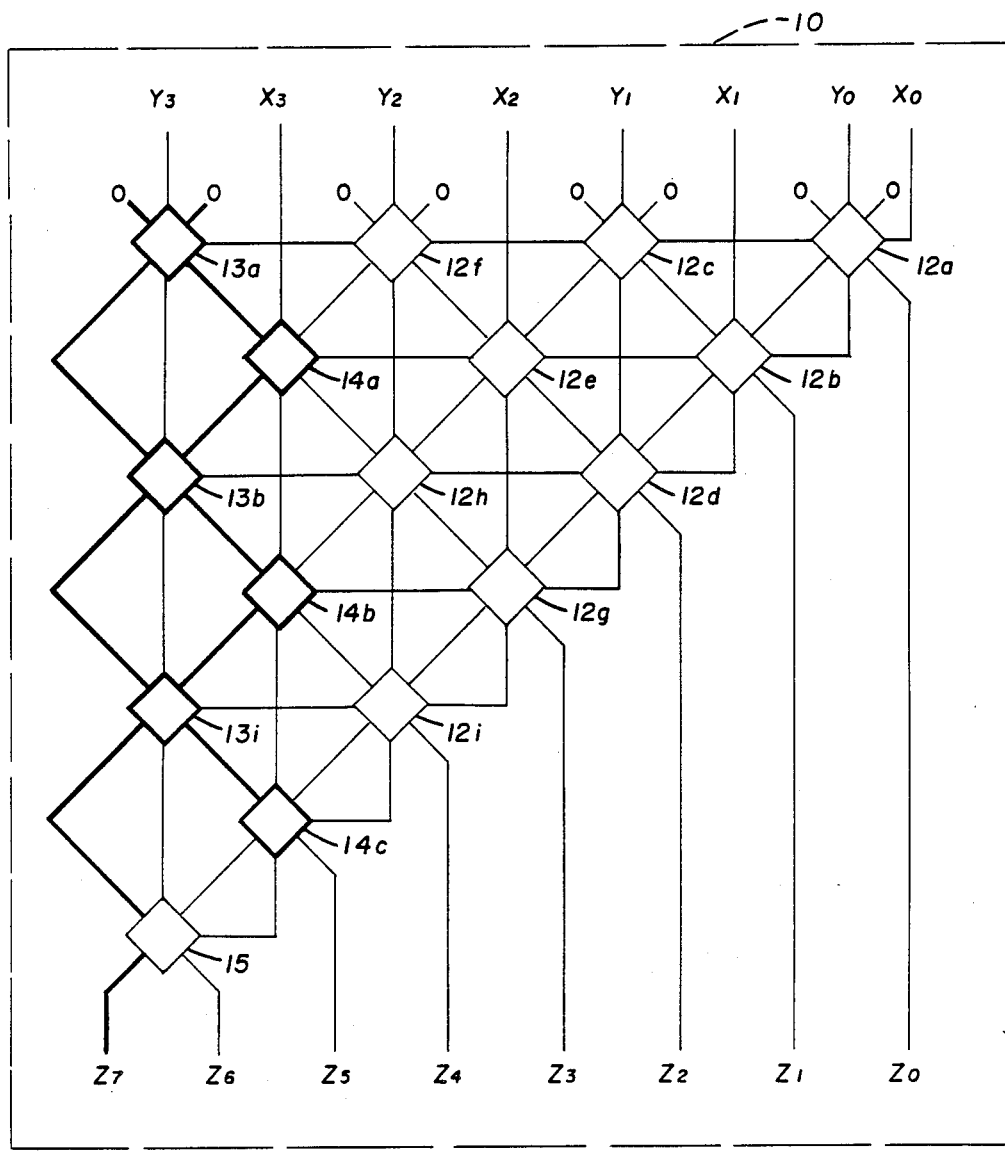
FIG. 2 shows the cells of 1a through 1d in a Guild array.

FIG. 1a shows a schematic and truth table for a cell M1. The cell M1 forms a building block or basic unit of the Guild array, two's complement multiplier in accordance with the present invention.

The formatting for particular cells in a Guild array, for multiplying binary numbers represented in two's complement notation, is accomplished by considering certain inputs and internal bits as having negative weight. The input words (X,Y are two numbers to be multiplied) are formed in signed digital representation of a two's complement number. As such, the following representations are made for a four-bit example:

$$X = -2^3 X_3 + 2^2 X_2 + 2^1 X_1 + 2^0 X_0 \quad (1)$$

$$Y = -2^3 Y_3 + 2^2 Y_2 + 2^1 Y_1 + 2^0 Y_0 \quad (2)$$

The multiplication of X and Y yields:

$$XY = 2^6(X_3 Y_3) + 2^5(-X_3 Y_2 - X_2 Y_3) + 2^4(-X_3 Y_1 + X_2 Y_2 - X_1 Y_3) + 2^3(-X_3 Y_0 + X_2 Y_1 + X_1 Y_2 - X_0 Y_3) + 2^2(X_2 Y_0 + X_1 Y_1 + X_0 Y_2) + 2^1(X_1 Y_0 + X_0 Y_1)) + 2^0(X_0 Y_0) \quad (3)$$

All of the terms of the form $X_i Y_j$ are called microproducts and have weight K if multiplied by $2^K$. Note that each microproduct, $$X_i Y_j \text{ for } 0 \leq i < \eta \text{ and } 0 \leq j < \eta \quad (4)$$

occurs somewhere in the expression of the product. Thus, a multiplier can be realized by forming all possible microproducts and then adding all microproducts of equal weight together along with carries from the addition of microproducts of a lesser weight.

Figure 6:
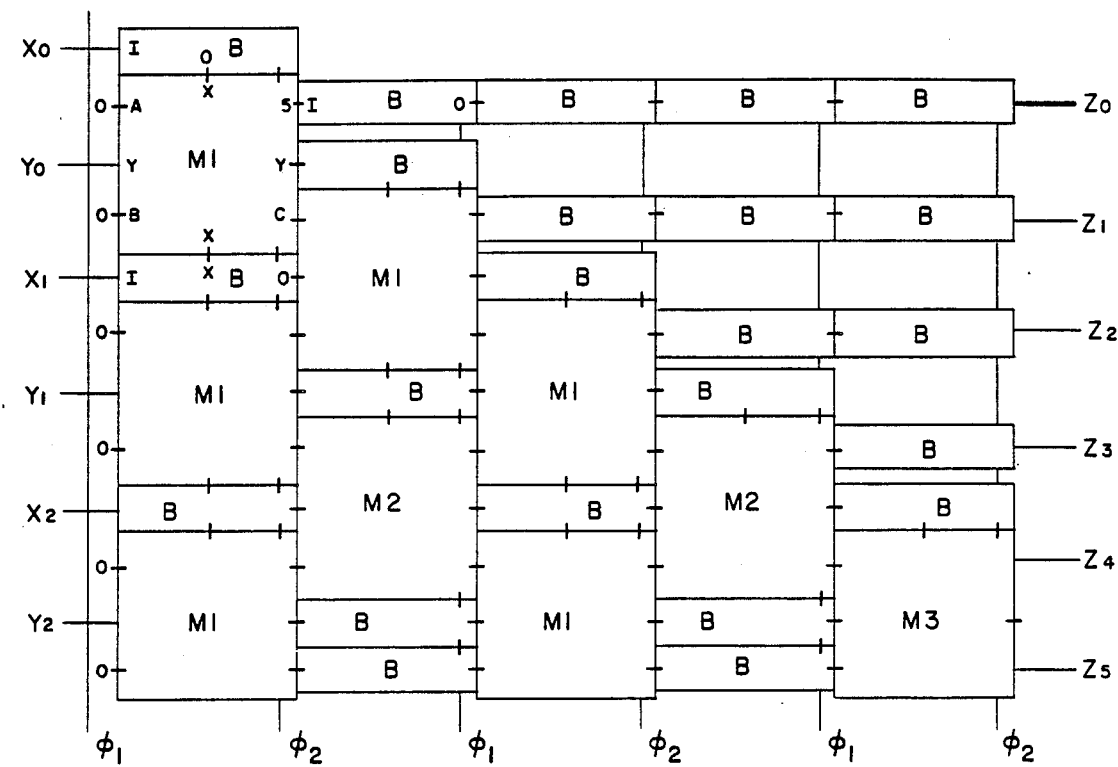
FIG. 6 shows a Guild array multiplier utilizing two's complement notation as integrated onto a chip.

Each cell performs the arithmetic function:

$$S + 2C_{i+1} = V + XY + C_i \quad (5)$$

in accordance with the general principles of cells utilized in Guild arrays. However, in order to handle two's complement notation, a particular implementation of equation (5) has been selected for each cell. Truth tables were derived to accomplish the particular implementation which would allow the solution of equation (3). Each cell represented in FIGS. 1a through 1d functions according to equation (5), but each is unique in the positive or negative weighting of each input or output. In order to avoid the necessity of two lines to represent a signed bit (i.e., one for magnitude and one for sign) the constraint is made that certain lines carry microproducts which result in values of (0, −1), while others result in values of (0, 1). Each cell M1, M2, M3, M4 actually receives a logical value of 0 or 1, but is interpreted by the cell to be negative or positive according to the cells carry circuit (discussed below) and position in the array. Cell type M2 treats the V input and the XY product input as negative numbers in the solution of equation (5). The 0 or −1 value for product XY is represented in FIG. 6 by the heavily outlined cell therein. Similarly, input V is heavily lined to denote its treatment of the input as 0 or −1. The resultant output indicated in the truth table of table 1b, indicates that the sum is generated as a 0 or positive 1, and thus retains its thin-lined representation. Conversely, output at carry $C_{i+1}$ is either 0 or −1, and is therefor heavily lined. Cell type M1 depicted in FIG. 1a, receives inputs: the sum of any previous partial product; XY, the product thereof; and $C_i$ any carry input. Cell M1 generates an output $C_{i+1}$, a carry output and S, the resultant sum in accordance with the truth table depicted in FIG. 1a. For instance, when V is 1, and XY is 0 and $C_i$ is 1, the resultant sum S is 0, while the carry output, $C_{i+1}$ is 1. Cell type M2 is depicted in FIG. 1b. A third cell type M3 is portrayed in FIG. 1c, wherein inputs V and $C_i$ have values of 0 or −1, while the XY product is 0 or +1. Again, the inputs which are treated as 0 or −1 (i.e., $C_i$) are depicted with heavy lines. In the case of cell type M3, carry output $C_{i+1}$ is treated as a 0 or a −1 and is heavily lined in FIG. 1c. For −1 inputs at V and $C_i$ and a XY product of 0, in cell type M3, a sum of 0 is generated with a carry of −1. As to FIG. 1d, cell type M4 is indicated which is the mathematical complement of cell type M1. Thus, the truth table for FIG. 1d is the same as the truth table in FIG. 1a, however, each nonzero value has negative weight, the cell type M4 treating all inputs and outputs as 0 or −1. Thus, for an input product XY of 0 and V, $C_i = 1$, a sum of 0 is generated with a carry output of −1. The internal circuitry of cell types M1 and M4 are identical, except that the effect of cell type M4 is to solve the equation $$-S - 2C_{i+1} = -V - XY - C_i \quad (6)$$

the equivalent of equation (5). The phrase "signed cells" refers to cell type M1's ability to handle 0 or positive numbers and cell types M2, M3 and M4's ability to process 0 or negative numbers. Hereafter, a positive sign cell is taken to be a cell type M1 while a negative sign cell is taken to mean a cell type M2, M3 or M4.

FIG. 2 shows the cell types of FIGS. 1a through 1d arranged in a triangular format or Guild array, generally shown at 10. The bits of a four bit (for example) binary word X to be multiplied are applied to the array input terminals $X_3$ to $X_0$. Similarly, the bits of word Y to be multiplied are applied at $Y_3$ to $Y_0$. The resultant product of XY appears at array output terminals $Z_7$ through $Z_0$, where $Z_7$ represents the sign. In accordance with equation (3), the cell types M1 through M4 are arranged as follows. A first cell 12a is used to calculate a microproduct having an order of 1, since it is multiplied by $2^0$ or 1. As is evident, the microproduct $X_0 Y_0$ will always be positive or 0. Thus, cell 12a is of type M1. The resultant sum appears at terminal $Z_0$ and any resultant carry $C_{i+}$ is passed to cell 12b. The microproduct of order 1 is a combination of the terms $X_1 Y_0$ and $X_0 Y_1$. These terms are respectively generated by cells 12b and 12c. Since the microproduct of order 1 includes only positive terms, cells 12b and 12c are also of type M1. A pattern becomes evident for generating the remainder of microproducts in a Guild array. The order 2 microproduct appears at output $Z_2$. In line with output $Z_2$ are cells 12d, 12e and 12f, of the M1 cell type in accordance with the $X_i Y_j$ term received. Cell 12e receives a carry input of any output generated by cell 12c. Cell 12d receives a carry signal from cell 12b. An examination of the microproduct having order 3 reveals two negative terms, $-X_3 Y_0$ and $-X_0 Y_3$. These negatives terms occur since $X_3$ and $Y_3$ are of negative weight per equations (1) and (2). Cells 12g and 12h are also of type M1, and represent the positive terms of the weight 3 microproduct. Cell 13a treats any inputs as negative and generates sum and carry output signals as negative, and is therefore of cell type M4. It must be noted, however, that cell type M4 has the same structure as cell M1, but the inputs and outputs of M4 have negative weight. Cell 14a, receiving the sum of the partial product occurring at cell 13a, and treats the signal as a 0 or negative 1 value. The $X_3 Y_0$ at cell 14a term has negative weight, as does the sum output from cell 13a. Thus, cell 14a is of type M2. It is apparent that the microproduct at output $Z_4$ is generated by cells 12i, 13b and 14b, which correspond to cell types M1, M4, and M2, respectively. The order 5 microproduct has two negative terms and comprises a cell 13c (type M4) and cell 14c (type M2). The order 6 microproduct is always positive or zero since bits $X_3$, $Y_3$ both have negative weight. Accordingly, negative values generated by cells 13c and 14c can be propagated through cell 15, of type M3, to generate any resultant carry to $Z_7$, the sign bit.

Figure 3:
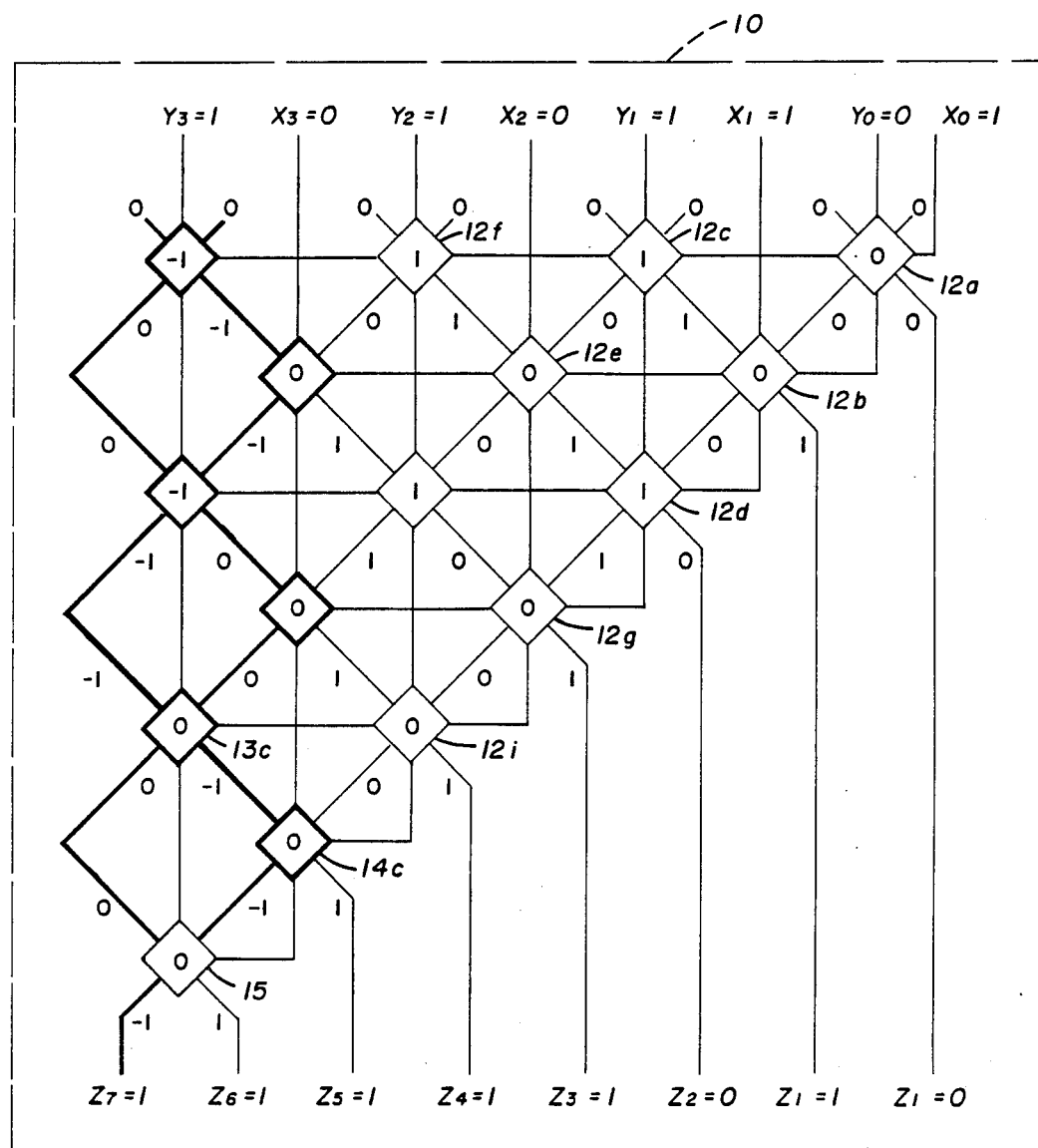
FIG. 3 shows cell bit information for a multiplication example.

FIG. 3 shows the Guild array of FIG. 1 and illustrates the multiplication of $-2 \times 3$. Inputs to the array $X_3$ through $X_o$ correspond to the binary representation for the number 3. Input terminals $Y_3$ through $Y_o$ receive the bits representing $-2$ in two's complement notation. Cell 12a has V and $C_i$ inputs of 0. The resultant microproduct for $X_o Y_o$, where $X_o=1$ and $Y_o=0$ is 0 and is designated as such within the boundaries of the cell. Obviously, a sum of 0 occurs at $Z_o$, while a carry of 0 is generated to cell 12b. V and $C_i$ are 0 for cell 12c, but the term $X_o Y_1 = 1$ resulting in a partial product value of 1 being generated to cell 12b. A 0 carry output is generated by cell 12c. As to cell 12b the $X_1 Y_o$ term is 0, the carry from 12a is 0, but the partial sum from cell 12c is 1, causing 12b to generate a 1 at $Z_1$. For cell 14c, $X_3 Y_2=0$, as is the carry from 12i. The previous sum V from cell 13c is $-1$. As determined by equation (5) the sum 1 occurs at $Z_5$ and a carry having a weight of $-1$ is generated to cell 15. The pattern of operation for the remaining cells being evident from the discussion with respect to cells 12a, 12b, and 12c, the specific logic manipulation of the remaining cells will not be discussed in further detail.

Figure 4:
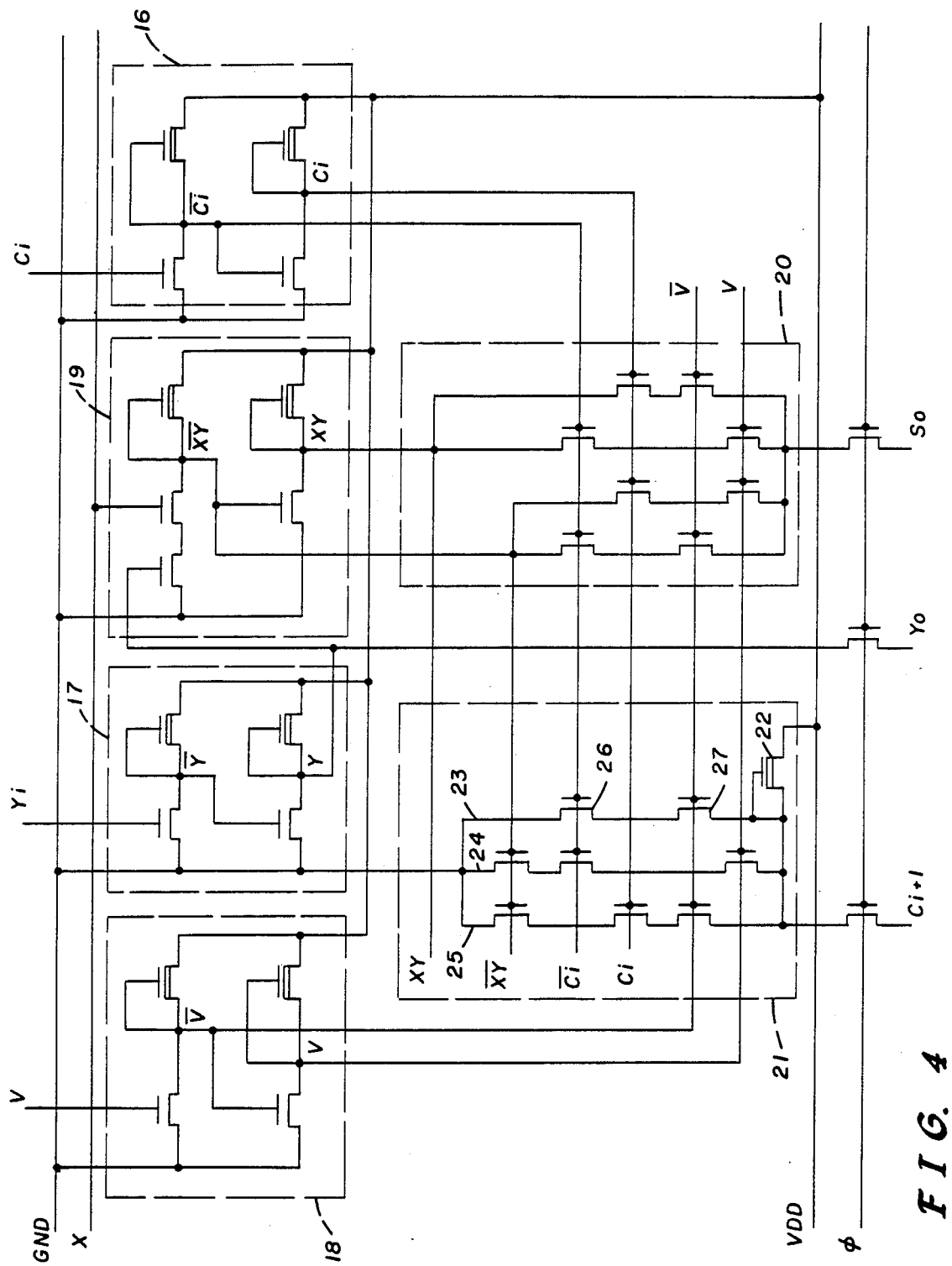
FIG. 4 details the circuitry of a first cell.

FIG. 4 shows the specific circuitry of cell M1 or M4. The circuit depicted in FIG. 4 utilizes three inverter pairs 16, 17 and 18 which receive input signals $C_i$, $Y_i$ and $V_i$, respectively. Each inverter pair 16, 17, and 18 generates an output representing the original signal and a complement of that signal. Circuit 19 includes a NAND and inverter for deriving the product XY and its complement. Sum circuit 20 utilizes a bank of pass transistors to allow a signal representing the XY product or its complement to pass to the sum output $S_o$. If $C_i$ and V are high or $\overline{C_i}$ and $\overline{V}$ are high, then XY is generated as the sum output. If $\overline{C_i}$ and V or $C_i$ and $\overline{V}$ are high, then the value for $\overline{XY}$ is allowed to pass. The carry circuit for cell type M1 is shown at 21. Carry circuit 21 is basically an AND/OR circuit which is high by its pull-up transistor 22 until pulled low. Three OR branches 23, 24, and 25 are utilized to pull down the drain of the pull-up transistor 22. Transistors 26 and 27 must be gated simultaneously, in other words, $\overline{C_i}$ and $\overline{V}$ must be high, to pull down transistor 22. The resultant carry signal appears at $C_{i+1}$.

Figure 5A:
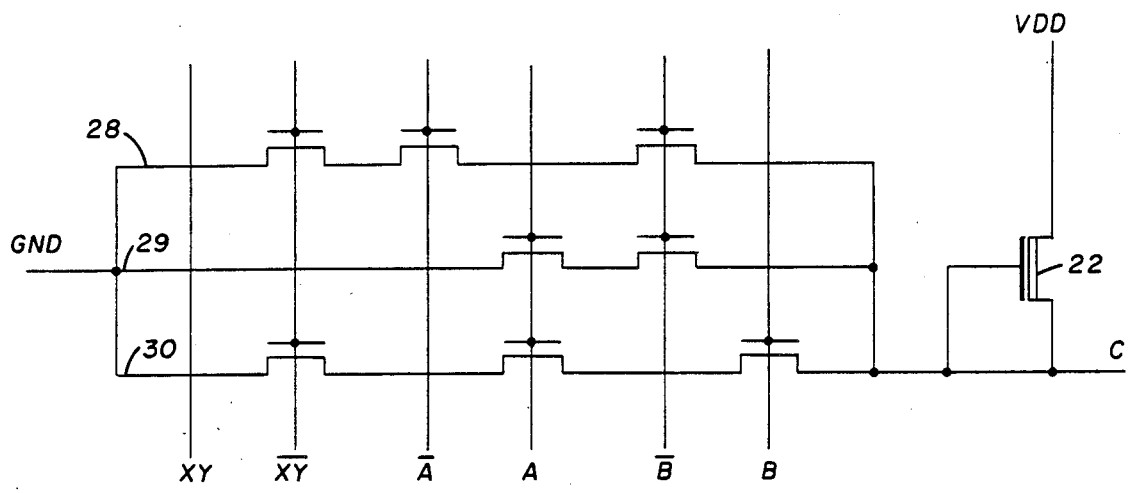
FIGS. 5a and 5b show the carry circuits of additional cells.
Figure 5B:
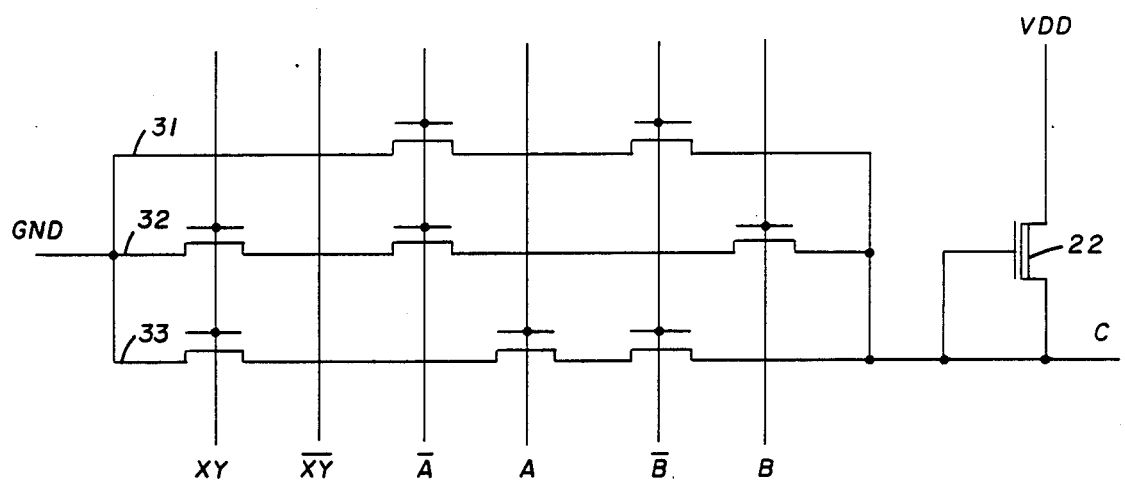

FIG. 5a represents the carry circuit or a cell of type M2. Again, 3 OR lines 28, 29, 30 may be used to pull down transistor 22. In OR line 29, $C_i$ and $\overline{V}$ must be high to pull down transistor 22. The carry circuit 5b is utilized in the cell M3 and comprises 3 OR lines 31, 32 and 33. As an example, the transistor 22 is pulled down via OR 33 when XY, $C_i$ and $\overline{V}$ are high signals. The circuitry for the 3 cells M1, M2, M3 are identical except for the carry circuits. The changes in circuitry evidenced in carry circuit 21, FIG. 5a and FIG. 5b provides the differences in the three cells which are utilized throughout the Guild array, allowing for the multiplication in two's complement notation.

By utilizing cells of substantially similar structure in a Guild array, an orderly circuit is realized which is readily formed onto a chip. This ordered formation of cells having minor differences allows for the efficient utilization of high large scale integration. FIG. 6 shows the cell elements of type M1 and M2, and M3 as laid out on a chip, and with their associated buffers. As is evident, a simple ordering of the cells is all that is required or this two's complement multiplier.

Modifications are apparent to those skilled in the art which do not depart from the spirit of the invention which is defined by the appended claims. For instance, the circuitry may be extended to handle words of 8 bits, for instance, by correspondingly increasing the numbers of cells. Pipelining of the circuit is possible to increase the efficiency of the Guild array multiplier.

What is claimed is:

1. A digital multiplier for multiplying digital numbers represented in two's complement notation comprising:
   a plurality of positively and negatively signed cells connected in a guild array, wherein said plurality of positively and negatively signed cells includes a most significant signed cell and a least significant signed cell, and wherein each signed cell except said least significant signed cell receives input signals from adjacent signed cells,
   each of said cell comprising;
   a plurality of inverter circuits which output signals and complements thereof,
   multiplying means with two inputs connected to receive respective bits of two corresponding numbers to be multiplied, the product of the two respective bits representing a microproduct term and
   a summing circuit connected to said multiplying means to receive the microproduct term as an input and connected to said plurality of inverters such that the summing circuit passes the microproduct as an output to an adjacent signed cell in accordance with the inverter circuit signals and complements thereof.

2. A digital multiplier as in claim 1, having a plurality of positively and negatively signed cells wherein each signed cell further comprises:
   a carry circuit connected to receive as input the inverter circuit signals and complements thereof and the multiplying means microproduct term; and
   a pull-up transistor which is pulled down in accordance with the inverter circuit signals, complements thereof, and the microproduct term, thereby generating a carry output signal.

3. A digital multiplier as in claim 2 having a plurality of positively and negatively signed cells wherein said plurality of cells comprises:
   a plurality of first negatively signed cells;
   a plurality of second negatively signed cells; and
   each carry circuit having first, second and third OR lines connected to the pull-up transistor, and connected to receive the inverter circuit signals and complements thereof, and the multiplier microproduct term, two of which must be high signals for one of the three OR lines to pull down the pull-up transistor.

4. A digital multiplier as in claim 3, having a plurality of positively and negatively signed cells wherein each first negatively signed cell comprises:
   said first, second and third OR lines;
   the first OR line pulls down the pull-up transistor when a first inverter circuit's complement, a second inverter circuit's complement, and a microproduct complement are high;

the second OR line pulling down when the first inverter circuit's signal and the second inverter circuit's complement are high; and the third OR line pulling down when the first inverter circuit's signal, the second inverter circuit's signal, and the microproduct complement are high.

5. A digital multiplier as in claim 4, having a plurality of positively and negatively signed cells wherein each first negatively signed cell is connected to adjacent cells in the array to receive a previous microproduct term V and a previous carry $C_{i+1}$ as input signals, to yield a microproduct term XY, and to generate a sum S and carry $C_i$ as output signals to adjacent cells, wherein V, $C_{i+1}$, and XY are of a set $(0, -1)$, and S and $C_i$ are of the set $(0, 1)$.

6. A digital multiplier as in claim 3, having a plurality of positively and negatively signed cells wherein each second negatively signed cell comprises:

said first, second and third OR lines;

the first OR line pulls down the pull-up transistor when a first inverter circuit's complement and second inverter circuit's complement are high;

the second OR line pulling down when the first inverter circuit's complement, the second inverter circuit's signal and the microproduct term are high; and the third OR line pulling down when the first inverter circuit's signal, the second inverter circuit's complement and the microproduct term are high.

7. A digital multiplier as in claim 6, having a plurality of positively and negatively signed cells wherein each second negatively signed cell is connected to adjacent cells in the array to receive a previous microproduct term V and a previous carry $C_{i+1}$ as input signals, to yield a microproduct term XY, and to generate a sum S and carry $C_i$ as output signals to adjacent cells, wherein V, $C_{i+1}$, and $C_i$ are of the set $(0,1)$, and XY and S are of the set $(0,1)$.

8. A digital multiplier as in claim 3 having a plurality of positively and negatively signed cells where in each positively signed cell comprises:

said first, second and third OR lines, the microproduct term having a complement; wherein the first OR line pulls down the pull-up transistor when a first inverter circuit's complement and a second inverter circuit's complement are high;

the second OR line pulling down when the first inverter circuit's signal, the second inverter circuit's complement and the microproduct complement are high; and the third OR line pulling down when the first inverter circuit's complement, the second inverter circuit's signal and the microproduct complement are high.

9. A digital multiplier as in claim 8, having a plurality of positively and negatively signed cells wherein each positively signed cell is connected to adjacent cells in the array to receive a previous microproduct term v and a previous carry $C_{i+1}$ as input signals, to yield a microproduct term XY, and to generate a sum S and array $C_i$ as output signals to adjacent cells, wherein v, $C_{i+1}$, XY, S and $C_i$ are of a set $(0,1)$.

10. A digital multiplier as in claim 8 having a plurality of positively and negatively signed cells wherein each first negatively signed cell comprises:

said first, second and third OR lines;

the first OR line pulls down the pull-up transistor when a first inverter circuit's complement, a second inverter circuit's complement, and a microproduct complement are high;

the second OR line pulling down when the first inverter circuit's signal and the second inverter circuit's complement are high; and the third OR line pulling down when the first inverter circuit's signal, the second inverter circuit's signal, and the microproduct complement are high.

11. A digital multiplier as in claim 10, having a plurality of positively and negatively signed cells wherein each second negatively signed cell comprises:

said first, second and third OR lines;

the first OR line pulls down the pull-up transistor when a first inverter circuit's complement and a second inverter circuit's complement are high;

the second OR line pulling down when the first inverter circuit's complement, the second inverter circuit's signal and the microproduct term are high; and the third OR line pulling down when the first inverter circuit's signal, the second inverter circuit's complement and the microproduct term are high.

12. A digital multiplier as in claim 11 having a plurality of positively and negatively signed cells wherein each signed cell except said least significant signed cell is connected to adjacent cells in the array to receive a previous microproduct term v and a previous carry $C_i$ as input signals, to yield a microproduct term XY, and to generate a sum S and carry $C_{i+1}$ as output signals to adjacent cells.

13. A digital multiplier as in claim 12, having a plurality of positively and negatively signed cells wherein V, $C_{i+1}$, XY, S and $C_i$ of the positively signed cell are of a set $(0,1)$.

14. A digital multiplier as in claim 13 having a plurality of positively and negatively signed cells wherein, for each first negatively signed cell, V, $C_{i+1}$, and XY are of a set $(0,-1)$ and S and $C_i$ are of a set $(0,1)$.

15. A digital multiplier as in claim 14, having a plurality of positively and negatively signed cells wherein, for each second negatively signed cell, V, $C_{i+1}$ and $C_i$ are of the set $(0,-1)$, and XY and S are of the set $(0,1)$.

* * * * *